United States Patent [19]

Utsumi et al.

[11] Patent Number: 5,085,287

[45] Date of Patent: Feb. 4, 1992

[54] CRUISE CONTROL APPARATUS FOR A VEHICLE

[75] Inventors: Yoshiyuki Utsumi; Kazuyori Katayama, both of Himeji, Japan

[73] Assignee: Mitsubishi Denki Kabushiki Kaisha, Tokyo, Japan

[21] Appl. No.: 631,503

[22] Filed: Dec. 21, 1990

[30] Foreign Application Priority Data

Dec. 26, 1989 [JP] Japan ................................. 1-341434

[51] Int. Cl.$^5$ ............................................. B60K 31/04
[52] U.S. Cl. ................................... 180/179; 123/350; 364/426.04
[58] Field of Search ............... 180/170, 174, 176, 177, 180/178, 179; 123/350, 351; 364/426.04, 424.1, 426.01

[56] References Cited

U.S. PATENT DOCUMENTS 4,931,939  6/1990  Kawata et al. .................... 180/179
4,941,098  7/1990  Yasuwaka et al. ................. 180/179

OTHER PUBLICATIONS

Speed Control Group 37, Ford 1985 Car Shop Manual, p. 37-05-17 (1985).

*Primary Examiner*—Andres Kashnikow
*Assistant Examiner*—Richard Camby
*Attorney, Agent, or Firm*—Sughrue, Mion, Zinn, Macpeak and Seas

[57] ABSTRACT

An improved cruise control apparatus for a vehicle having a fail-safe function is provided in which indefinite operations of the apparatus at the time of failure in the power supply thereof can be avoided. A cruise control switch has a plurality of switch elements connected in parallel with each other, the switch elements being selectively operated to change the output voltage at the output terminal of the cruise control switch so as to provide a plurality of command signals for setting and cancelling cruise control. A control unit is connected to the output terminal of the cruise control switch for performing a plurality of different cruise control operations in response to the cruise control command signals from the cruise control switch. The control unit includes a plurality of comparators each having a first input terminal connected to the output terminal of the cruise control switch and a second input terminal supplied with a reference voltage. A primary power supply is commonly connected to the input terminal of the cruise control switch and the control unit in such a manner that the second input terminals of the comparators are supplied with a plurality of different reference voltages. A secondary power supply is connected to the second input terminals of the comparators for shifting the reference voltages at the second input terminals of the comparators to a fail-safe side when the primary power supply fails.

3 Claims, 3 Drawing Sheets

CRUISE CONTROL APPARATUS FOR A VEHICLE

BACKGROUND OF THE INVENTION

The present invention relates to a cruise control apparatus for a vehicle capable of making the vehicle cruise at a constant speed.

In general, a cruise control apparatus for a vehicle is constructed such that a control unit drives, upon receipt of a command signal which is generated by a cruise control switch when it is operated by the driver, a throttle valve in an intake pipe of an internal combustion engine to open and close through the action of an actuator so as to make the vehicle travel at a target speed.

An example of such a cruise control apparatus including a cruise control switch and a control unit is diagrammatically illustrated in FIG. 3. The known cruise control apparatus illustrated includes a cruise control switch 1 and a control unit 2. The cruise control switch 1 is, together with a horn switch 3, incorporated in a steering wheel (not shown) and constitutes a steering wheel built-in switch circuit 5. The horn switch 3 is connected at one end thereof through a slip ring 6 to a horn relay 7 which is in turn connected to a power supply $V_1$ and a horn 8. The horn switch 3 is also connected at the other end thereof to ground through a bearing in a steering shaft (not shown). The cruise control switch 1 includes a cancel switch 9 for cancelling a cruise control operation, a set/coast switch 10 for setting a cruise control operation during a non-cruise control operation as well as automatically decelerating the vehicle during a cruise control operation, and a resume/acceleration switch 11 for automatically resuming the vehicle to cruise during a non-cruise control operation as well as accelerating the vehicle during a cruise control operation. The set/coast switch 10 is connected in series with a resistor $R_1$ to form a first serial connection. The resume/acceleration switch 11 is connected in series with a resistor $R_2$ to form a second serial connection. The first serial connection including the set/coast switch 10 and the resistor $R_1$, the second serial connection including the resume/acceleration switch 11 and the resistor $R_2$, and the cancellation switch 9 are connected in parallel with each other. The cruise control switch 1 is connected at one end thereof to the control unit 2 through a slip ring 12, and at the other end thereof to a primary power supply $V_2$ through a slip ring 4. Inside the control unit 2, an output of the cruise control switch 1 which is input to the control unit 2 via the slip ring 12 is connected through a resistor $R_3$ to ground and at the same time is input to the respective first or positive terminals of comparators 13 through 15. The second or negative terminals of the comparators 13 through 15 are connected to the primary power supply $V_2$ through corresponding resistors $R_4$ through $R_6$, respectively, and at the same time to ground via resistor $R_7$. The voltages $V_H$, $V_M$ and $V_L$ at the negative input terminals of the comparators 13 through 15, respectively, are predetermined so as to satisfy the following relationship: $V_H > V_M > V_L$. A secondary power supply $V_3$ for exclusively supplying power to the cruise control unit 2 is connected to the comparators 13 through 15. The output terminals of the comparators 13 through 15 are connected to a power supply of 5 volts via resistors $R_8$ through $R_{10}$, respectively, and the outputs $V_a$ through $V_c$ of these comparators are input to a central processing unit (CPU) 16.

In operation, when the set/coast switch 10 is turned on with the vehicle travelling under non-cruise control, the input voltage $V_i$ fed from the cruise control switch 1 to the control unit 2 is expressed by the following equation;

$$V_i = \{R_3/(R_1 + R_3)\} \times V_2.$$

In this case, the input voltage $V_i$ is between $V_M$ and $V_L$, so the output voltage $V_c$ of the comparator 15 becomes high while the output voltages $V_a$, $V_b$ of the comparators 13, 14 both remain low. As a result, the CPU 16 operates to recognize a command signal from the set/coast switch 10, and accordingly drive the unillustrated throttle valve. Similarly, when the resume/acceleration switch 11 is turned on, the input voltage $V_i$ is expressed by the following equation;

$$V_i = \{R_3/(R_2 + R_3)\} \times V_2.$$

In this case, the input voltage $V_i$ is between $V_H$ and $V_M$, so the output voltages $V_b$, $V_c$ of the comparators 14, 15 both become high while the output voltage $V_a$ of the comparator 13 remains low. As a result, the CPU 16 recognizes a command signal from the resume/acceleration switch 11, and accordingly drive the throttle valve. Further, when the cancellation switch 9 is turned on, the input voltage $V_i$ becomes substantially equal to the output voltage $V_2$ of the primary power supply which is greater than $V_H$. Thus, in this case, the output voltages $V_a$, $V_b$ and $V_c$ of the comparators 13 through 15 all become low, whereby the CPU 16 recognizes a command signal from the cancellation switch 9, and drives the throttle valve accordingly. These operational relationships are tabulated in Table I below.

TABLE I

| Control SW | Input Voltages $V_i$ | $V_a$ | $V_b$ | $V_c$ |
|---|---|---|---|---|
| | | Output Voltages | | |
| Set/Coast SW | $\{R_3/(R_1 + R_3)\} \times V_2$ | 0 | 0 | 5 |
| Resume/Accel SW | $\{R_3/(R_2 + R_3)\} \times V_2$ | 0 | 5 | 5 |
| Cancellation SW | $V_2$ | 5 | 5 | 5 |
| All SWs Off | 0 | 0 | 0 | 0 |

With the above-mentioned known cruise control apparatus, however, if the primary power supply $V_2$ fails or wiring between the primary power supply $V_2$ and the control unit 2 is cut or broken, the voltages $V_H$, $V_M$ and $V_L$ at the negative input terminals of the comparators 13 through 15, respectively, all become zero and the voltage $V_i$ at the positive input terminals of the comparators 13 through 15 also becomes zero, so that the output voltages $V_a$ through $V_c$ of the comparators 13 through 15 becomes floating or indefinite, causing an abnormal situation that cruise control may be automatically set without the cruise control switch 1 being set by the driver. Similarly, if a soldered connection at a between the control unit 2 and the primary power supply $V_2$ is broken or becomes a bad connection, the voltages $V_H$, $V_M$ and $V_L$ all become zero, causing another abnormal situation that the operation of the control unit 2 becomes indefinite as in the case of the cruise control switch 1 being in its "OFF" range.

SUMMARY OF THE INVENTION

Accordingly, the present invention is intended to obviate the above-described drawbacks of the known cruise control apparatus.

An object of the present invention is to provide an improved cruise control apparatus for a vehicle in which indefinite operations of the apparatus at the time of failure in the primary power supply thereof can be avoided.

Another object of the present invention is to provide an improved cruise control apparatus for a vehicle which is able to detect the "OFF" range of the cruise control switch even if the power supply to the cruise control switch and the control unit fails.

Another object of the present invention is to provide an improved cruise control apparatus for a vehicle which has a fail-safe function of allowing the driver to cancel cruise control even if the power supply to the control unit fails.

In order to achieve the above objects, according to the present invention, there is provided a cruise control apparatus for a vehicle comprising:

a cruise control switch having a plurality of switch elements connected in parallel with each other, the cruise control switch having an output terminal and an input terminal, the switch elements being selectively operated to change the output voltage at the output terminal of the cruise control switch so as to provide a plurality of command signals for setting and cancelling cruise control;

a control unit connected to the output terminal of the cruise control switch for performing a plurality of different cruise control operations in response to the cruise control command signals from the cruise control switch, the control unit including a plurality of comparators each having a first input terminal connected to the output terminal of the cruise control switch and a second input terminal supplied with a reference voltage;

a primary power supply connected to the input terminal of the cruise control switch for supplying power to the switch elements therein, the primary power supply being also connected to the control unit in such a manner that the second input terminals of the comparators are thereby supplied with a plurality of different reference voltages; and a secondary power supply connected to the second input terminals of the comparators for shifting the reference voltages at the second input terminals of the comparators to a fail-safe side when the primary power supply fails.

Preferably, the connection between the secondary power supply and the second input terminals of the comparators is located inside the control unit.

According to the cruise control apparatus as constructed above, if the primary power supply fails or wiring between the primary power supply and the control unit is cut or broken, the output voltage of the cruise control switch falls into the "OFF" range or zero but the control unit is supplied from the secondary power supply so as to shift the reference voltage at the second input terminal of each comparator to a fail-safe side, thus preventing it from becoming zero. As a result, the control unit does not become indefinite but instead determines that the output of the cruise control switch is in the "OFF" range. Further, in the event that wiring between the primary power supply and the control unit alone fails, the reference voltage of each comparator shifts to the fail-safe side so that cruise control can be cancelled by a driver's manipulation of the cruise control switch.

The above and other objects, features and advantages of the present invention will become more readily apparent from the ensuing detailed description of a preferred embodiment of the invention taken in conjunction with the accompanying drawings.

DESCRIPTION OF THE PREFERRED EMBODIMENT

The present invention will now be described in detail with reference to a preferred embodiment as illustrated in the accompanying drawings.

Figure 1:
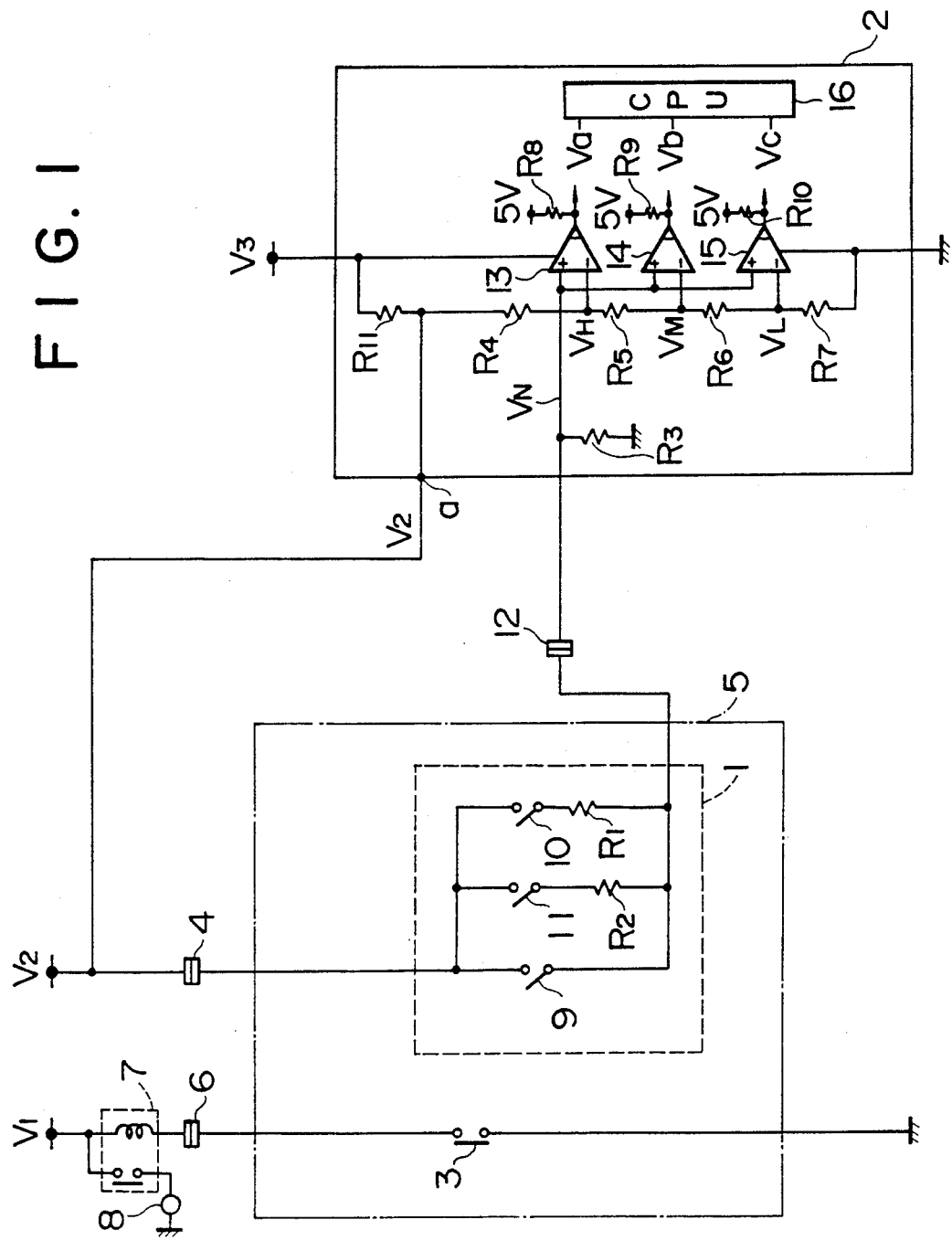
FIG. 1 is a schematic circuit diagram of a cruise control apparatus for a vehicle in accordance with the present invention.
Figure 3:
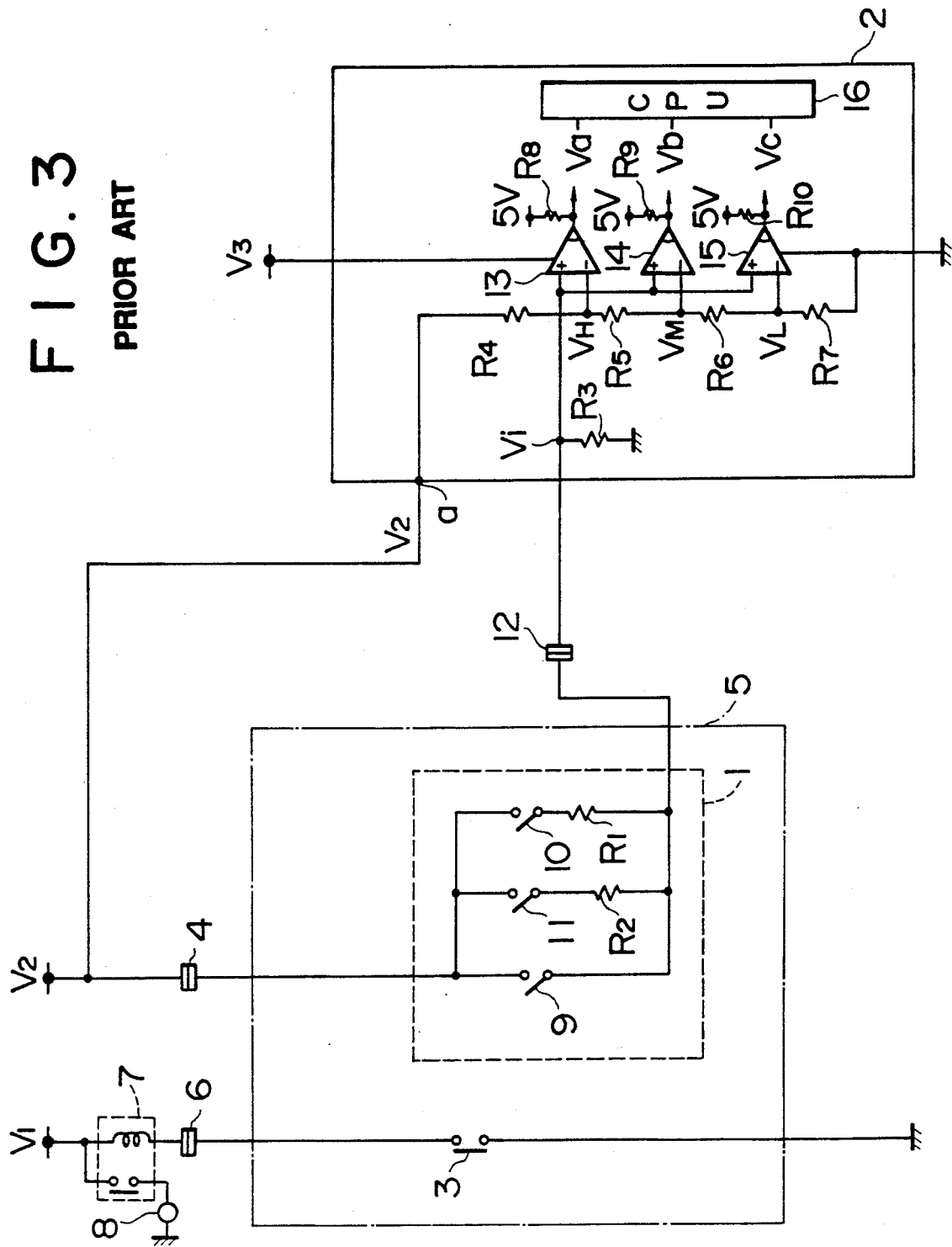
FIG. 3 is a view similar to FIG. 1, but showing a known cruise control apparatus for a vehicle.

In FIG. 1, there is illustrated an electric circuit of a cruise control apparatus for a vehicle constructed in accordance with the principles of the present invention. As shown in this figure, the embodiment of the present invention illustrated is substantially similar to the above-described known apparatus of FIG. 3 but differs therefrom in that in the present invention, the secondary power supply $V_3$ is connected via a resistor $R_{11}$ to the second or negative input terminals of the comparators 13 through 15 so as to provide them with fail-safe reference voltage levels if the primary power supply $V_2$ should fail. Specifically, the resistor $R_{11}$ has one end thereof connected to the secondary power supply $V_3$ and the other end thereof connected to that end of the resistor $R_4$ which is connected to the primary power supply $V_2$.

Figure 2:
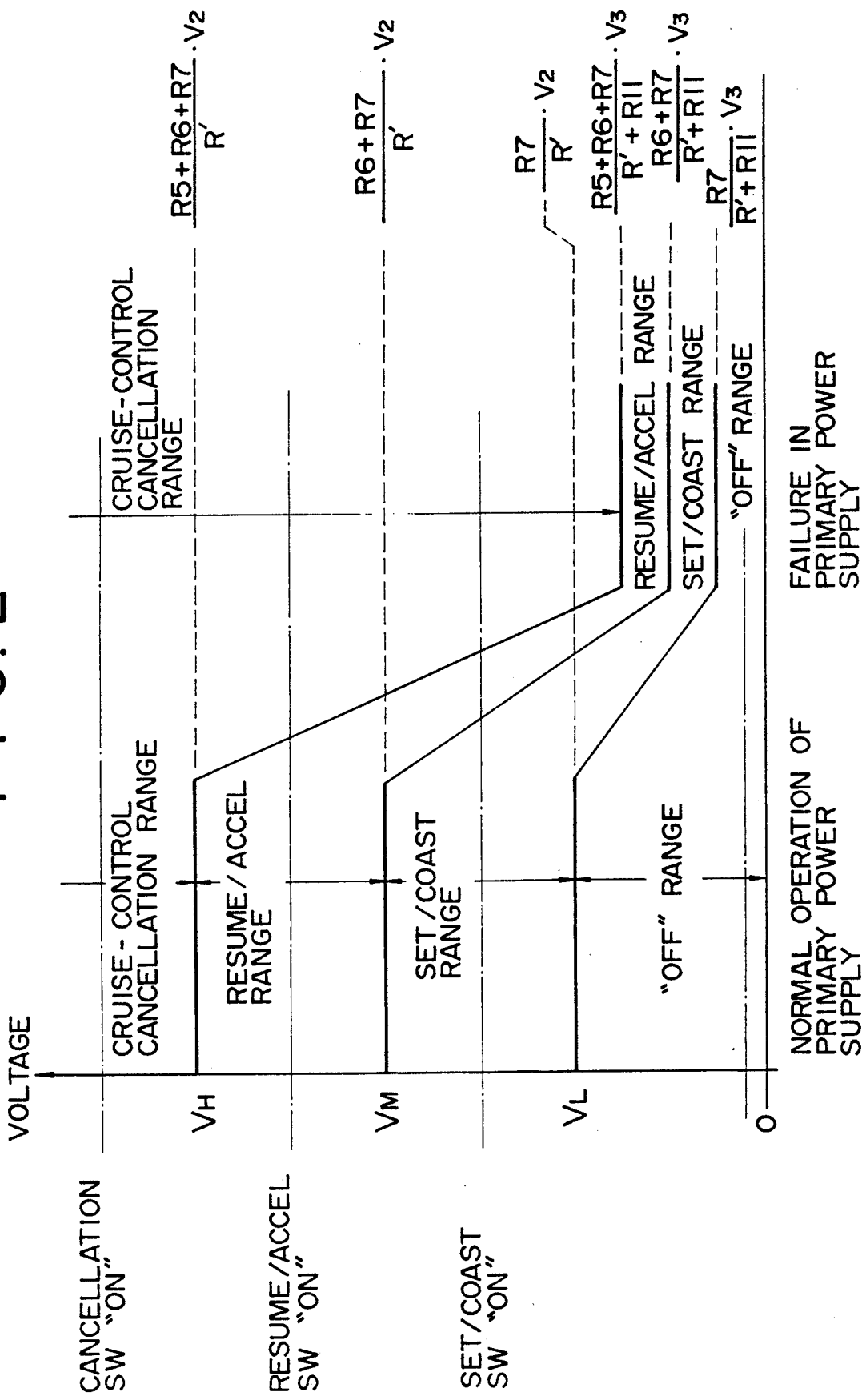
FIG. 2 is a graphic representation showing the reference voltage levels $V_H$, $V_M$ and $V_L$ at the second input terminals of comparators of FIG. 1 when the power supply to the cruise control switch and the control unit is normal and when the power supply fails, respectively, as well as showing various operating ranges of the apparatus.

The operation of this embodiment will now be described in detail with particular reference to FIG. 2.

When the apparatus normally operates or the primary power supply $V_2$ is normal and correctly connected at a junction a to the control unit 2, the reference voltages $V_H$, $V_M$ and $V_L$ at the second or negative input terminals of the comparators 13 through 15 are expressed as follows;

$$V_H = \{(R_5 + R_6 + R_7)/R'\} \times V_2,$$

$$V_M = \{(R_6 + R_7)/R'\} \times V_2,$$

and $$V_L = (R_7/R') \times V_2,$$

where $R' = R_4 + R_5 + R_6 R_7$. In this situation, the output voltage $V_i$ of the cruise control switch 1 varies as shown in Table I, depending upon the "ON" or "OFF" condition of the switches 9 through 11. When the cancellation switch 9 is turned on for example, the control unit 2 operates in a cruise-control cancelling range. Also, in other cases, the control unit 2 operates in the same manner as with the aforementioned known apparatus of FIG. 3.

If, however, a break or bad connection takes place at the junction a while wiring between the primary power supply $V_2$ and the control unit 2 through the cruise control switch 1 is normal, the voltage $V_3$ of the secondary power supply is imposed upon the negative input terminals of the comparators 13 through 15 so that the reference voltages $V_H$, $V_M$ and $V_L$ at these negative input terminals become as follows;

$$V_H = \{(R_5 + R_6 + R_7)/(R' + R_{11})\} \times V_3,$$

$$V_M = \{(R_6 + R_7)/(R' + R_{11})\} \times V_3,$$

and $$V_L = \{R_7/(R' + R_{11})\} \times V_3.$$

In this regard, since the resistance of the resistor $R_{11}$ is sufficiently great, the following inequity is established;

$$(R_7/R') \times V_2 > \{(R_5 + R_6 + R_7)/(R' + R_{11})\} \times V_3.$$

Therefore, even when any one of the switches 9 through 11 is turned on, the control unit 2 operates in the cruise-control cancellation range, so cruise control is thereby cancelled or stopped, thus ensuring the safety of the vehicle. In this manner, a fail-safe operation is performed.

On the other hand, in cases where the cruise control switch 1 is in the "OFF" range in which all the switches 9 through 11 are turned off, the output voltage $V_i$ of the cruise control switch 1 is less than $V_L$ and hence the CPU 16 detects that the cruise control switch 1 is in the "OFF" range. As a result, the control unit 2 continues the present control operation. In addition, since the reference voltages $V_H$, $V_M$ and $V_L$ never become zero, no indefinite operation of the apparatus will result.

Further, in cases where the primary power supply $V_2$ fails (i.e., wiring between the primary power supply $V_2$ and the cruise control switch 1 and wiring between the primary power supply $V_2$ and the control unit 2 are both cut or broken, the control unit 2 operates in the same manner as in the above case in which the cruise control switch 1 is in the "OFF" range. Thus, in this case, too, there will result no indefinite operation of the control unit 2.

As described in the foregoing, according to the present invention, the control unit 2 is supplied by the secondary power supply $V_3$ even if the primary power supply $V_2$ fails or if wiring between the primary power supply $V_2$ and the control unit 2 is cut or broken, so that the reference voltages $V_H$, $V_M$ and $V_L$, which are imposed on the negative input terminals of the comparators 13 through 15, respectively, for comparison purposes, do not become zero, thus avoiding an indefinite operation of the control unit 2 as well as enabling the control unit 2 to detect whether the cruise control switch 1 is in the "OFF" range. In addition, at the time of failure in the primary power supply $V_2$, the reference voltages $V_H$, $V_M$ and $V_L$ for the respective comparators 13 through 15 shift to the fail-safe side under the action of the secondary power supply $V_3$, thus ensuring the safety control of the vehicle.

What is claimed is:

1. A cruise control apparatus for a vehicle comprising:
   a cruise control switch having a plurality of switch elements connected in parallel with each other, said cruise control switch having an output terminal and an input terminal, said switch elements being selectively operated to change the output voltage at the output terminal of said cruise control switch so as to provide a plurality of command signals for setting and cancelling cruise control;
   a control unit connected to the output terminal of said cruise control switch for performing a plurality of different cruise control operations in response to the cruise control command signals from said cruise control switch, said control unit including a plurality of comparators each having a first input terminal connected to the output terminal of said cruise control switch and a second input terminal supplied with a reference voltage;
   a primary power supply connected to the input terminal of said cruise control switch for supplying power to said switch elements therein, said primary power supply being also connected to said control unit in such a manner that the second input terminals of said comparators are thereby supplied with a plurality of different reference voltages; and
   a secondary power supply connected to the second input terminals of said comparators for shifting the reference voltages at the second input terminals of said comparators to a fail-safe side when said primary power supply fails.

2. A cruise control apparatus for a vehicle according to claim 1, wherein the connection between said control unit and said primary power supply is located inside said control unit.

3. A cruise control apparatus for a vehicle according to claim 1, wherein said switch elements comprise a cancellation switch for cancelling cruise control and a set/coast switch for setting a coasting operation.

* * * * *